United States Patent Office 3,336,157
Patented Aug. 15, 1967

3,336,157
WATER AND OIL REPELLANT FINISHES AND METHODS OF APPLYING THEM
Nathaniel C. Shane, Oakland, and Herman G. Weiland, Westfield, N.J. (both of 185 Foundry St., Newark, N.J. 07105)
No Drawing. Filed Dec. 6, 1963, Ser. No. 328,459
11 Claims. (Cl. 117—161)

The present invention relates to durable water and oil repellency, and it particularly relates to methods and compositions for imparting durable water and oil repellency to textiles, leather, paper, fiber glass, non-woven sheet materials and other woven, knitted or matted fibrous materials.

Although not limited thereto, the present invention will be particularly described in its application to methods and compositions for imparting durable water and oil repellent finishes to woven and other textile materials.

It is among the objects of the present invention to provide a durable water and oil repellent finish particularly applicable to textiles and other materials which will be highly resistant to laundering and dry cleaning and which will enhance the texture and hand of materials.

Another object is to provide a durable, novel oil and water repellent finish to textiles and other materials without interfering with the tensile strength and without undesirably affecting the color or other characteristics of the textile material and with enhancement of the body and hand of the textile materials.

A further object is to impart a durable water and oil repellent finish to woven textiles composed of either natural or synthetic fibers or combinations thereof which will enhance and greatly improve the softness and hand without undesirably affecting other desirable properties such as lack of gas-fading, brilliancy of the dyed materials, crease resistant properties and the like.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has been found that certain silicone compounds with or without added fluorinated compounds give excellent oil and water repellency and may be conveniently applied in a padding bath or in other aqueous systems or even inorganic solvent solutions.

The preferred silicone compounds are those which contain a silicon atom bonded to three nitrogen groups and to one long chain aliphatic group, the nitrogen groups preferably being imine groups with the long chain aliphatic group preferably having from 12 to 24 carbon atoms. Desirably these compounds are combined with an organic fluorine compound and then cured but even without such organic fluorine compound it has been found that they will cross-link with cotton, rayon and other cellulosic fibers and also apparently combine with the organic fluorinated compound.

The preferred fluorinated compounds are those that contain 4 to 24 carbon atoms and usually double the number of fluorine atoms with at least two fluorine atoms being present for each carbon atom.

In proportions, it is desirable to use about equal parts of the silicone and organic fluorine compound or to vary proportions from one part of one to four parts of the other.

The preferred silicone compounds are high molecular weight aliphatic halogenated silicone compounds, such as $R(SiX_2)_nX$, where R is an alkyl group containing 12 to 24 carbon atoms, X is a halogen, preferably chlorine, bromine or fluorine, and $n$ may range from 1 to 12.

This silicone compound is preferably combined with an imine having the formula

where Y is a hydrogen or an alkyl group containing from 1 to 22 carbon atoms, $R_1$ and $R_2$ are alkyl groups containing from 1 to 4 carbon atoms. The halogen is desirably taken up or removed by an inorganic or organic alkaline compound and it may be an amine such as $NR_3R_4R_5$ in which $R_3$, $R_4$ and $R_5$ are alkyl groups containing 1 to 4 carbon atoms or hydrogen.

Desirably, 1 mole of the silicone compound is combined with 3 moles of the ring or imine compound. To take up the chlorine, 3 moles of the amine compound may be present. The initial silicone compound is a chlorinated alkyl silane such as an octadecyltrichlorosilane.

A typical reaction would be

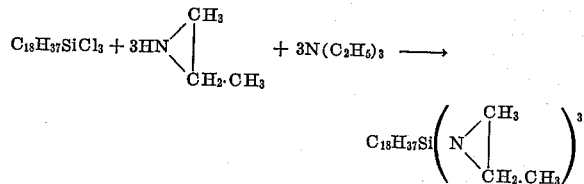

This compound may be referred to as octadecyl tris [1-(2 methyl) aziridinyl] silane.

In general, for the purposes of the present invention it has been found that other compounds of this type may be used of the formulation $R_6SiR_7$, where $R_6$ is an alkyl group containing 12 to 24 carbon atoms and $R_7$ is an imine group which may contain from 2 to 4 carbon atoms.

The preferred reaction involves combining a high molecular weight fatty silicone trihalide or trichloride with a low molecular weight alkylene imine in the presence of an alkaline agent to take up the hydrochloric acid evolved.

Among the imines that may be used in the above reaction are:

A. Ethylene imine
B. Propylene imine
C. Butylene imine

The preferred imines are the first two set forth above.

These compounds are desirably combined with fluorocarbons. Normally when silicone derivatives are combined with fluorocarbons, the silicone derivatives neutralize the effect of the fluorocarbons and decrease or destroy oleophobic properties. It has been found that with the silicone imine compounds of the present invention an altogether opposite effect is achieved.

The preferred fluorocarbon compounds are acrylate and methacrylate esters, particularly the esters of perfluoroalkanesulfonamido alkanols with a side chain containing 4 to 12 fully fluorinated carbon atoms. The terminal fluoro carbon chain must be fully fluorinated.

A typical compound is

where $n$ is 1 to 6.

Typical compounds are N-alkyl, N-alkonal perfluoroalkanesulfonamides such as

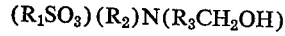

where $R_1$ is a perfluoroalkyl group containing 4 to 12 carbon atoms, $R_2$ is a short chain alkyl side group containing 1 to 6 carbon atoms (methyl to hexyl) and $R_3$ is an alkylene bridging group containing 1 to 12 carbon atoms.

In the acrylate esters the last parenthetical expression has the formula $$(RCH_2OCOCH=CH_2)$$

In the methacrylate esters the expression has the formula (R being an alkyl having 1 to 6 carbon atoms)

$$(RCH_2OCOCCH_3=CH_2)$$

The other acrylate compound that may be used is 1,1 dihydroperfluoro alkyl acrylate esters that have a terminal fully fluorinated alkyl grouping with 3 to 9 carbon atoms (either straight or branched chain).

These fluorocarbon compounds have the formula:

$$CH_2:CHCOOCH_2C_nF_{2n}CF_3$$

where $n$ has an integer value of 3 to 9.

Although the above compounds are preferably prepared in aqueous baths containing 2 to 10% by weight of solids they may also be applied in non-aqueous baths such as organic solvent solutions of chlorinated hydrocarbon solvents, containing 2 to 5 carbon atoms and either 1 or 2 chlorine atoms per carbon atom.

It has been found, surprisingly, that these water repellent finishing operations for cellulosic or other fabrics may be carried on to give unusually effective results with the use of emulsified derivatives of the silicone compounds. Where perfluoro acrylate ester compounds are also included they are used either in equal proportions or in the proportion of 1½ parts by weight or 2 parts by weight of the emulsified imines as compared to 3 parts by weight of the silicone derivatives.

Desirably, the solids in the composition should form about 2 to 10% of the aqueous bath which is used for finishing the fabric either in a padder or in an application roll machine.

The padder may either be of the single or double nip type.

The preferred fluorocarbon compounds are perfluoroalkane sulfonamides in which the alkane may contain from 3 to 15 carbon atoms. Less preferably, it is also possible to use perfluorocarbons having the general formula $$CH_2:CHCOOCH_2(CF_2)_nCF_3$$

Among the fluorinated compounds which may be used are
(a) 1,1-dihydro perfluoroalkylacrylate and polymers of fluoroalkyl esters of acrylic acid having the formula $CH_2:CHCOOCH_2R$, where R is a perfluoro alkyl group having 1 to 9 carbon atoms and 1 to 3 fluorine atoms per carbon atom.
(b) Acrylate esters of N-alkyl, N-alkanol perfluoroalkane sulfonamides.
(c) n-Heptafluorobutyric acid and its esters and salts.
(d) Nonadecafluoro capric acid and its esters and salts.
(e) Polyvinyl 1,1-dihydroperfluoroalkyl ethers.
(f) Perfluoroalkyl alkanol sulfonyl fluorides.
(g) Saturated perfluoromonocarboxylic acids, their esters, salts and metal complexes, particularly chromium complexes.
(h) Perfluorobutyryl and perfluorooctanoyl chloride and compounds in which chlorine is replaced by bromine, hydroxy, carboxy or amino groups.

The first two compounds are preferred.

In general, the alkyl groups will contain from 2 to 10 carbon atoms. These silicone and fluorine compounds may be applied in a padding machine or in a dye beck to cotton, rayon, acetate, nylon, Dacron, Orlon, wool, leather and paper materials at a pH of about 3 to 7 and desirably 4 to 5.

Mineral acids should be avoided and small amounts (0.02 to 0.08%) of acrylic or methacrylic acids may be employed with excellent results as catalysts and to regulate the pH of the bath.

Less preferably acetic or formic acid may be used in amount of 0.01 to 0.1%.

There should be a pick-up of about 1 to 4% of active ingredients on the fibers and the application is followed by drying at 150–250° F. for 3 to 10 minutes followed by curing for 2 to 7 minutes at 280–350° F.

Desirably, the silicone compounds should be in the bath in a ratio of about 1 to 3 parts by weight of the silicone compound to 1 to 3 parts by weight of the organic fluorine compounds.

Surprisingly acrylic acid not only regulates the pH to about 4 to 5 but also acts catalytically with the silicone and the fluorocarbon compounds to enhance greatly both their water and oil repellent properties even in amounts as small as 0.01 to 0.02% by weight.

*Example 1*

In making up a silicon imine water repellent aqueous bath, it is possible to use:

| | Percent by weight |
|---|---|
| Silicone imine compound | 3 to 6 |
| Zinc stearate | 1 to 2 |

(all percentages based on weight of bath)

This composition is impregnated on cotton duck in a padder, dried at 200° F. for five minutes and cured for one and one-half minutes at 350° F.

The duck fabric will have a water repellent finish which is extremely resistant to acid hydrolysis and also to soap and soda ash treatments at the boil.

The same treatments may be carried out with nylon-Dacron-rayon blends, acetate-viscose suiting and cotton poplin.

*Example 2*

As an alternative form of aqueous padding bath, the following composition may be employed:

| | Percent by weight |
|---|---|
| Silicone imine compound | 6 |
| Organic fluorine compound | 2 |
| Zinc stearate | 2 |

*Example 3*

Still another composition which may be employed is:

| | Percent |
|---|---|
| Silicon imine | 6 |
| Perfluoro compound | 4 |
| Zinc stearate | 2 |

In general, it has been found possible to utilize the silicone imine compound rather than the usual emulsified polysiloxanes in much smaller quantities to achieve much greater water repellency and also oil repellency.

For example, as little as ½ to 1% of the imine silicones will give a much more durable water repellent finish which will retain its effectiveness in acid scouring and commercial laundering.

These silicones are used desirably with nonionic and cationic dispersing agents and is desirable, with quaternary compounds such as N-cetyl-N-ethyl morpholinium ethosulphate.

For example, it is possible to use 1 to 3% of Triton X100, Surfonic N-95, Triton X305 and Renex 697.

A particularly satisfactory result of the present application is that although there is a most effective oil and water repellency developed, nevertheless the fabric has a most desirable and attractive hand.

As additional examples:

*Example 4*

In aqueous padding in double nip padding roll arrangement, a woven cotton fabric may be passed through a bath containing ½ to 5% of solids which bath will have equal parts of a silicone imine and one of the above fluorocarbons.

Such a bath with a pick-up of ½ to 2½% solids will give a very high oil and water repellency and will greatly increase the spray ratings.

Example 5

With a non-aqueous solution, it is possible to use in a chlorinated hydrocarbon solvent having a boiling point of 72° to 88° C., 2% to 5% of one of the above silicone imine derivatives and 2% to 5% of one of the above fluorocarbons.

Preferably a pH of 6 to 8 is employed with the water systems, and a temperature of 70° to 100° F. is also desirably employed.

It is also possible to use petroleum hydrocarbon solvents. It is preferable, however, to use chlorinated solvents such as trichloroethane as the principal liquid bath constituent.

The various baths will have an indefinite bath life without formation of gummy substances on the pad rollers, and the fabrics will have greater water and oil repellency which will not be possible with the silicone derivatives by themselves nor with the fluorocarbons by themselves.

The silicone imine derivatives and the fluorocarbons by themselves produce low water repellency, but in combination, they produce unusually high water repellency and also high oil repellency with most satisfactory hand.

The preferred water and oil repellent surfacing on the fabric should have a weight of 2 to 10% of the fabric, with the silicone imine and fluorocarbon being present in about equal proportions or one being present in proportions of at least 30 to 70% of the other.

Example 6

In preparing one pass or one bath treatments, it is possible to use the following proportions of the silicone imine derivatives and the fluorocarbons.

| | Percent |
|---|---|
| Silicon imine compound | 40 |
| Emulsified fluorocarbon | 60 |

This is a most effective aqueous bath when used in 2 to 10% solid concentration.

Although padding is the preferred form of application, dipping, spraying or other methods of liquid treatment may be employed.

In these aqueous baths, it is possible to use various types of thermo-setting and non-thermo-setting resins such as polyvinyl acetate, acrylic resins, urea formaldehyde resin, melamine formaldehyde resins, urethaneformaldehyde resins, dimethyl ethylene resins and urea triazone resins in amounts ranging from 10% to 20% without breaking the bath and without disadvantageously affecting the water or oil repellent properties.

As catalysts, it is possible to use zinc nitrate and magnesium chloride, however, amine hydrochloride types are preferable as catalysts for the resin systems.

Example 7

With a solvent phase composition, it is possible to utilize the following in making a one pass product.

| | Percent |
|---|---|
| Imine derivative | 40 |
| Fluorocarbon in chlorinated hydrocarbon solvents | 60 |

The concentration of the bath may be from 2 to 5% solids with a wet pick-up of 70 to 80% on the woven textile or knitted fabric and a dry pick-up of 1½ to 3½%.

This composition may be applied by padding, dipping or spraying.

Desirably, applications are made at room temperature, and the drying followed by curing is carried out at 240° to 320° F. for a period of 3 to 10 minutes.

Example 8

In making the preferred silicone derivative of the present invention it is desirable to utilize

| | Parts by weight | Moles |
|---|---|---|
| Octadecyl trichloro silane | 337 | 1 |
| Propylene imine | 171 | 3 |
| Triethyl amine | 303 | 3 |
| Benzene | 100 | |

The flask is first charged with the silane and the amine and the imine are mixed and then the mixture is added slowly, drop by drop, with agitation, with the temperature being controlled at 50° C.

The reaction mixture is filtered and then evaporated under a vacuum to remove the benzene and there will be produced about a 90% yield of the octadecyl tris[1-(2-methyl)]aziridinyl silane.

The amine acts as an alkalizing agent to take up any hydrochloric acid released and other alkalizing agents may be utilized. Even sodium and potassium hydroxide may be employed in lieu of the amine.

The above compound may be readily emulsified in water in combination with 1 to 2% of a nonionic compound such as an ethylene oxide compound of the type of Triton X100, Igepal CO 630, Triton X305, Alepal CO 436, Renex 690, and other similar ethylene oxide condensates.

Desirably 2 to 5% of the above silane may be combined with 2 to 5% of the fluoro compound in the aqueous bath.

The resultant fabrics have most satisfactory spray ratings and give a most satisfactory hand.

Example 9

| | Percent by weight |
|---|---|
| Silane as above | 2 to 5 |
| Acrylate ester of N-alkyl N-alkanol perfluorooctane sulfonamide | 2 to 5 | in an aqueous bath as applied to a woven cotton textile fabric, followed by drying and curing at 300° F. for 2 to 3 minutes.

In connection with Example 9 comparative tests were made, giving the following results:

| | Fluoro Compound by itself | Silane by itself | Example Nine |
|---|---|---|---|
| Spray Rating: | | | |
| Initially | 80 | 100 | 100 |
| After 20 washings | 0 | 70 | 70 |
| Suter Hydrostatic Test: | | | |
| Initially | 40 | 45 | 45 |
| After 20 washings | 15 | 25 | 35 |
| Dynamic Absorption Test: | | | |
| Initially | 30 | 20 | 20 |
| After 20 washings | 65 | 50 | 23 |
| Hand: | | | |
| Initially | Harsh | Soft | Soft |
| After 20 washings | Less Harsh | Soft | Soft |

Example 10

The above compounds may be applied also in non-aqueous systems where hydrocarbon or chlorinated solvents may be used as the vehicle. As an example 1 to 4% of the silane would be dissolved in methyl chloroform or trichloro ethane together with 1 to 4% of Scotchgard FC203 organic solution (dissolved in methyl chloroform—15% strength). The combination is then sprayed onto leather, sheepskins, upholstery fabrics, or cotton fabrics. After drying off the organic solvent the fabric may be cured at 250° F. for 3 minutes.

Various fluoro compounds that may also be used are generally commercially sold by Minnesota Mining and Manufacturing Company under the trade names of Scotchgard FC-154, FC-201, FC-203, FC-205 and FC-208.

Desirably, the fluorocarbons are used in an emulsion with a nonionic surface active agent.

These compounds are desirably incorporated in an aqueous solution of 30% concentration, such as Scotchgard FC–208 and in a 15% organic solvent solution, such as Scotchgard FC–203.

These compounds are generally described in U.S. Patents 2,803,615; 2,642,416; 2,826,564 and 2,839,513.

The preferred compound is specifically described in Patent 2,803,615.

In general, the imine cross links with the fluorocarbonate and the cellulose of the cotton or rayon textile fiber.

Although the preferred silane contains 3 imine groupings of either ethylene or propylene imine, less preferably there may be one or two imine groups instead of three imine groups.

A most unusual result of the present invention is the desirable hand which is achieved where fluoro compounds are used as contrasted to the harsh hand which is characteristic of fabrics treated with fluoro compounds.

Desirably, the pick-up or weight on the fabric of the combined coating should range from 1 to 4% and the weight of the solids per unit weight of the fabric being treated may range from 5 parts by weight of the solid ingredients of the bath to each part by weight of the fabric.

The imine compound in the bath and particularly in the subsequent curing appears to combine both with the cellulose of the fabric as well as with the fluoro compound to give most unusual results, particularly with cotton, rayon and linen fabrics.

The effect appears to be most noticeable with aqueous baths but is also quite apparent with organic solvent baths.

The oil and water repellent properties are also achieved with non-cellulosic material such as leather and paper.

In general, the high molecular weight alkyl propylene imine or ethylene imine silane by itself gives excellent water proofing characteristics but it is desirably combined with the fluoroacrylate ester in either aqueous or organic solvent baths or solutions.

The preferred organic solvents are methyl chloroform, carbon tetrachloride, or aliphatic hydrocarbons derived from petroleum and having a boiling point of 50 to 100° F.

In both the oil and water baths the concentration of solids may vary from 2 to 10% and preferably from 2 to 5% with a wet pick-up of 50 to 80% of the weight of the fabric and a dry pick-up of 1 to 4% of the weight of the fabric or yarn, preferably a cellulosic fabric or yarn.

Desirably the aqueous bath should have a pH of 5 to 6 achieved by the addition of 0.015% (0.01 to 0.03%) of acrylic acid.

The preferred fluorine compounds are those which contain 5 to 15 of the following groupings in a chain

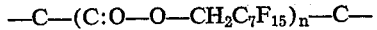

$n$ being 5 to 15. These are derived by reacting 1,1-dihydroperfluoro-octanol, $C_7F_{15}CH_2OH$ with acrylic acid to form a monomer which is then polymerized to a polymer having 5 to 15 or more units.

The preferred acrylate ester is

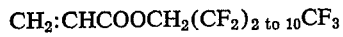

Apparently the acrylate ester combines with the tris-silane and with the cellulosic fibres to give a cross linking not possible with the fluorine compounds or silanes by themselves.

This combination is greatly enhanced by addition of less than 0.1% by weight of acrylic acid in the aqueous bath (preferably 0.01 to 0.03%).

Although the tris-silane is preferred, less desirably the mono-silane or the di-silane may be used.

Such silane compounds may be represented by the formula

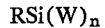

where R is an alkyl group containing 16 to 22 carbon atoms and preferably octadecyl and W is an ethylene or propylene imine and $n$ is 1, 2 or 3.

Some of these imine silanes are derived from the following halogenated silanes:

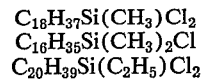

These compounds are used in the same molar proportions in the reaction and the reaction products are employed in the aqueous or organic solvent bath in the same proportions.

Less preferably compounds such as

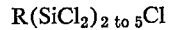

may be used with the number of propylene imine or ethylene imine groups corresponding to the number of chlorine atoms present.

Although in the silane forming reaction an amine is preferably used to take up the hydrochloric acid, other alkaline agents may be used such as sodium, potassium or ammonium hydroxide. Trimethyl, ethyl or propyl amines, however, are preferred since no salts are precipitated or left to be removed.

What is claimed is:
1. A process of rendering a material water and oil repellent which consists in treating it in a carrier liquid with an alkyl tri-imine silicone in which the alkyl group contains from 12 to 24 carbon atoms and the tri-imine contains from 6 to 12 carbon atoms and also including in the treating mixture a fluorinated organic compound of the formula $CH_2=CHCOOCH_2(CF_2)_nCF_3$ in an amount of at least 2% by weight, $n$ being an integer of 3 to 9, then drying the material and curing it.

2. As a new compound octadecyl tris [1-(2 methyl) aziridinyl] silane.

3. A process for rendering a textile fibre water and oil repellent which consists in treating it in a carrier liquid with a compound of the general formula

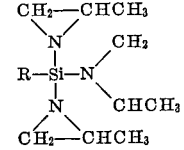

where R is an alkyl group containing from 16 to 22 carbon atoms and an organic fluorine compound of the formula $CH_2=CHCOOCH_2(CF_2)_nCF_3$ in an amount of at least 2% by weight, $n$ being an integer of 3 to 9, then drying the textile fibre and curing it.

4. The process of claim 3 in which R represents $C_{18}H_{37}$.

5. The process of claim 3 in which the organic fluorine compound is an acrylate ester of N-alkyl N-alkanol perfluorooctane sulfonamide.

6. The process of claim 3 in which the silicone compound is present in a ratio of from 1 to 3 parts by weight of the silicone compound to 1 to 3 parts by weight of the fluorine compound.

7. The process of claim 3 in which the fabric is dried and then cured at approximately 300° F.

8. A method of oil and waterproofing textiles which consists in treating them in a carrier liquid with octadecyl tris [1-(2 methyl) aziridinyl] silane and also the compound acrylate ester of N-alkyl N-alkanol perfluorooctane sulfonamide, said alkyl and alkanol containing 1 to 8 carbon atoms, drying the textiles and then curing them.

9. A method of oil and waterproofing textiles which consists in treating them with octadecyl tris [1-(2 methyl) aziridinyl] silane and also the compound acrylate ester of N-alkyl N-alkanol perfluorooctane sulfonamide, said alkyl and alkanol containing 1 to 8 carbon atoms, in an aqueous bath containing 2 to 5% by weight of each of said compounds, drying the textiles and then curing them.

10. The method of claim 9, in which 0.01 to 0.003% of acrylic acid is added to the bath as a catalyst and pH control agent.

11. A method of oil and waterproofing textiles which consists in treating them with octadecyl tris [1-(2 methyl) aziridinyl] silane and also the compound acrylate ester of N-alkyl N-alkanol perfluorooctane sulfonamide, said alkyl and alkanol containing 1 to 8 carbon atoms, in an organic solvent bath containing 1 to 4% by weight of each of the compounds, drying the textiles and then curing them.

References Cited

UNITED STATES PATENTS

| 2,439,689 | 4/1948 | Hyde | 117—124 |
| 2,660,736 | 12/1953 | Biefeld | 117—161 X |
| 3,236,672 | 2/1966 | Shane et al. | 117—139.5 X |

FOREIGN PATENTS

| 834,990 | 3/1952 | Germany. |

WILLIAM D. MARTIN, *Primary Examiner.*

T. G. DAVIS, *Assistant Examiner.*